United States Patent [19]
Sato

[11] Patent Number: 5,764,867
[45] Date of Patent: Jun. 9, 1998

[54] IMAGE RECORDING WITH VARIABLE NUMBER OF TONES

[75] Inventor: Nobuhiko Sato, Yokohama, Japan

[73] Assignee: Canon Kabushiki Kaisha, Tokyo, Japan

[21] Appl. No.: 109,575

[22] Filed: Aug. 17, 1993

Related U.S. Application Data

[63] Continuation of Ser. No. 777,166, Oct. 16, 1991, abandoned.

[30] Foreign Application Priority Data

Oct. 22, 1990 [JP] Japan ............................. 2-281959
Oct. 22, 1990 [JP] Japan ............................. 2-281960

[51] Int. Cl.$^6$ ............................. G06K 15/00
[52] U.S. Cl. ............................. 395/115; 375/112
[58] Field of Search ............................. 395/101, 109, 395/115, 116, 164–166, 102; 358/523, 524, 530, 539

[56] References Cited

U.S. PATENT DOCUMENTS

| | | | |
|---|---|---|---|
| 4,681,470 | 7/1987 | Nakajima | 400/323 |
| 4,743,959 | 5/1988 | Frederiksen | 358/518 |
| 4,937,681 | 6/1990 | Fujinawa et al. | 358/426 |
| 4,949,190 | 8/1990 | Thompson | 358/426 |
| 5,003,484 | 3/1991 | Ng | 395/115 |
| 5,068,805 | 11/1991 | Tsuzuki | 395/164 |
| 5,216,754 | 6/1993 | Sathi et al. | 395/113 |

FOREIGN PATENT DOCUMENTS

| | | | |
|---|---|---|---|
| 320713 | 6/1989 | European Pat. Off. | 395/101 |
| 2643994 | 9/1990 | France | 395/101 |

*Primary Examiner*—Arthur G. Evans
*Attorney, Agent, or Firm*—Fitzpatrick, Cella, Harper & Scinto

[57] ABSTRACT

Disclosed is an image recording apparatus which records received printing data as n-tone image data under ordinary conditions but which is capable also of recording the data as m-tone (m<n) image data. When the tone image based upon the received printing data is recorded on a recording medium, the memory capacity usable for recording the image is compared with the memory capacity needed for recording, and it is decided, based upon the comparison, whether to record the image in n tones or m tones.

18 Claims, 6 Drawing Sheets

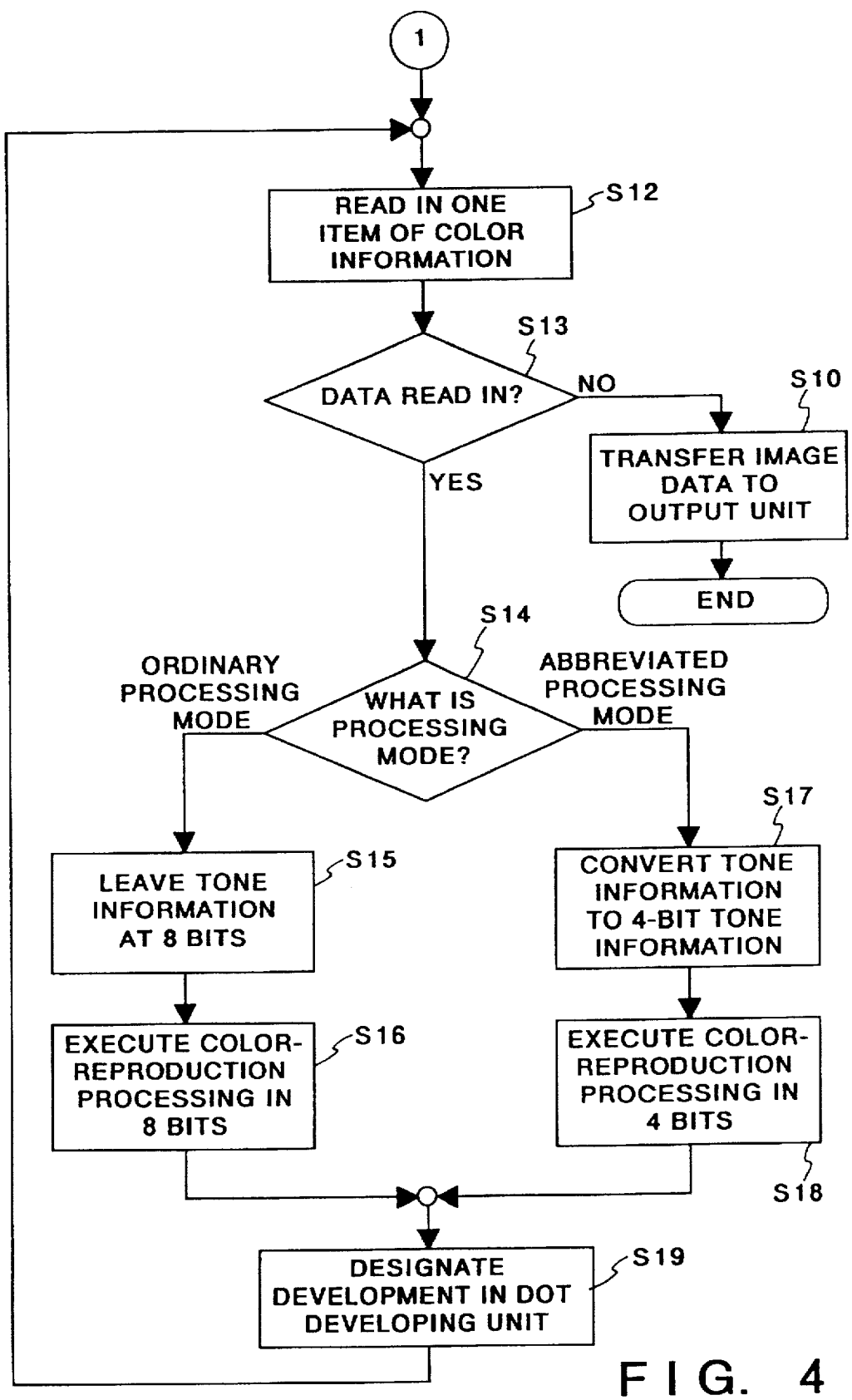
F I G. 4

5,764,867

IMAGE RECORDING WITH VARIABLE NUMBER OF TONES

This application is a continuation of application Ser. No. 07/777,166, filed Oct. 16, 1991, now abandoned.

BACKGROUND OF THE INVENTION

This invention relates to an image recording apparatus and, more particularly, to an image recording apparatus for recording a tone image based upon externally entered multivalued image data. Further, the invention relates to an image processing apparatus for processing externally entered n-tone (where n is a natural number) image data and outputting the processed image data to a recording apparatus.

In a conventional apparatus of this type, and especially in a color printing apparatus, the given multivalued data is faithfully developed in an internal memory and the data is processed so as to be reproduced.

However, in a case where the amount of memory needed for applying color-reproduction processing to an entire image is too large, the practice in the prior art is to apply such processing solely to the portion of the image capable of being reproduced. As a consequence, part of the image is missing in the printed results.

SUMMARY OF THE INVENTION

Accordingly, an object of the present invention is to provide an image recording apparatus in which part of an image will not be left out even if the amount of memory capable of being used for recording an image is less than the amount of memory required.

According to the present invention, the foregoing object is attained by providing an image recording apparatus for recording a tone image, which is based upon externally entered n-tone printing data, on a prescribed recording medium, comprising first recording means for recording the entered printing data as an n-tone image, second recording means for recording the entered printing data as m-tone (m<n) image data, and selecting means for selecting either the first recording means or the second recording means.

Another object of the present invention is to provide an image recording apparatus in which the number of tones is automatically reduced so that part of an image will not be left out, even if the amount of memory capable of being used for recording an image is less than the amount of memory required.

According to the present invention, the foregoing object is attained by providing an image recording apparatus for recording a tone image, which is based upon externally entered n-tone printing data, on a prescribed recording medium, comprising comparing means for comparing an amount of memory usable for tone reproduction in a memory possessed by the apparatus itself, and an amount of memory needed for tone reproduction based upon received printing data, and control means for performing recording of the image upon reducing the number of tones reproduced based upon the printing data when it is determined by the comparing means that the amount of memory needed for tone reproduction is greater than the usable amount of memory.

Further objects, features and advantages of the present invention will become apparent from the following description based upon the accompanying drawings and the claims appended thereto.

BRIEF DESCRIPTION OF THE DRAWINGS

FIGS. 3 and 4 are flowcharts for describing the contents of processing from the selection of a processing mode in conformity with the capacity of a memory to the transfer of data to an output unit in accordance with a first embodiment of the invention;

DESCRIPTION OF THE PREFERRED EMBODIMENTS

The preferred embodiments of the present invention will now be described in detail with reference to the accompanying drawings.

Figure 1:
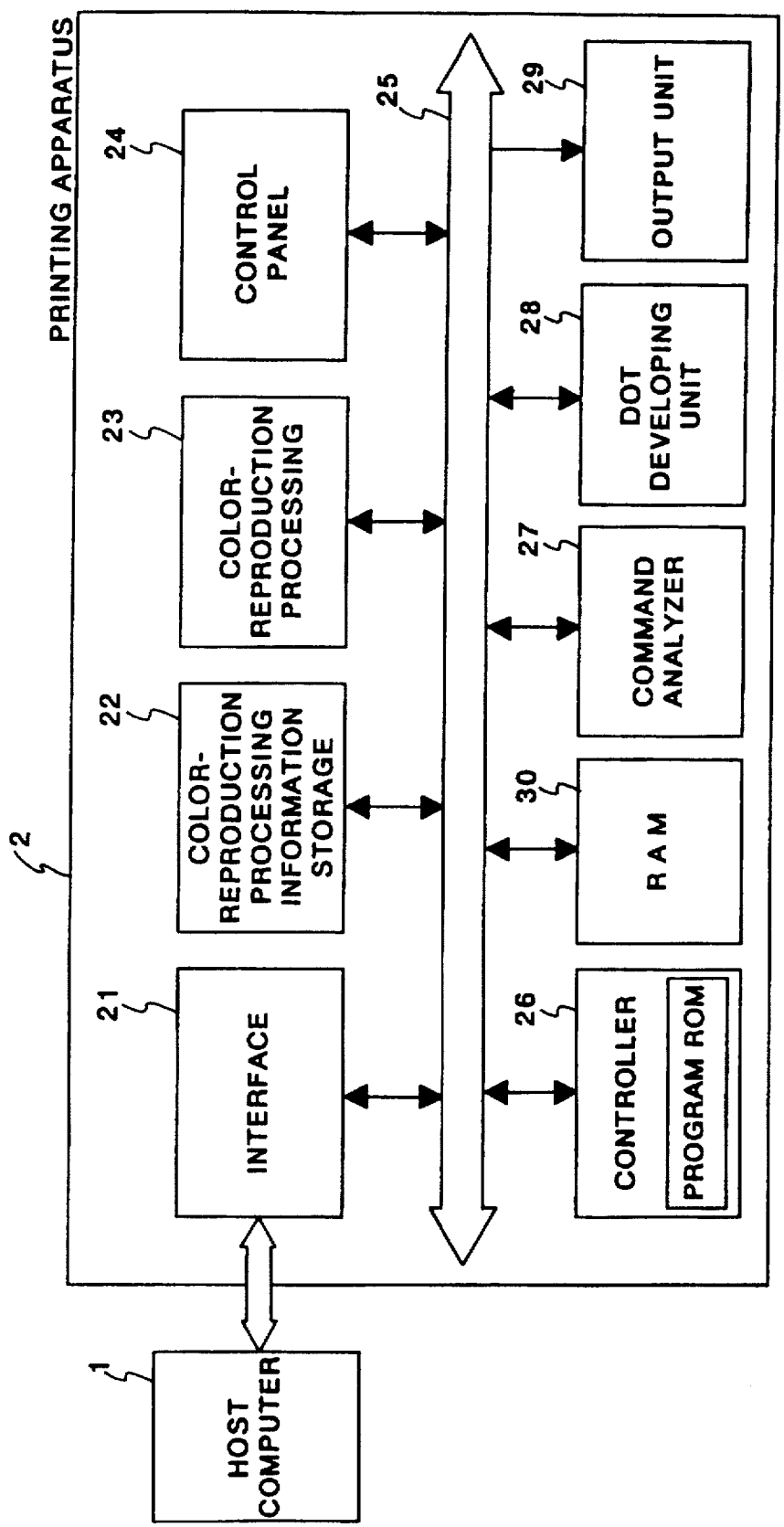
FIG. 1 is a block diagram illustrating a printing apparatus embodying the present invention.

FIG. 1 is a block diagram illustrating a printing apparatus (indicated at numeral 2) embodying the present invention.

In FIG. 1, numeral 1 denotes a host computer which outputs printing data (printing data which includes color information, as well as control commands for the printing apparatus 2 proper).

The main body of the printing apparatus 2 comprises an interface 21 for receiving data from the host computer 1, a unit 22 for storing color-reproduction processing information, namely information (a table, etc.) required when color-reproduction processing is executed, a color-reproduction processing unit 23 which performs color-reproduction processing, a control panel 24 for setting/changing parameters of the printing environment, a data bus 25, a controller 26 for overall control of the apparatus, a command analyzer 27 for analyzing data sent from the host computer 1, a dot developing unit 28 for developing image data, which has been formed through color-reproduction processing, into dots, an output unit 29 for forming a permanent visible image on paper in accordance with the data developed into dots, and a RAM 30 used as both a working area during operation of the controller 26 and as a frame memory employed in dot development.

The controller 26 comprises a central processing unit (CPU) and a program ROM which stores the processing procedure (a program in accordance with the flowcharts of FIGS. 3 and 4) executed by the CPU. Though any printer capable of tone reproduction may be used as the control unit 29, a well-known color laser-beam printer is taken as an example in this embodiment. The RAM 30 is used also as a reception buffer for temporarily storing the printing data received from the host computer 1.

Figure 2:
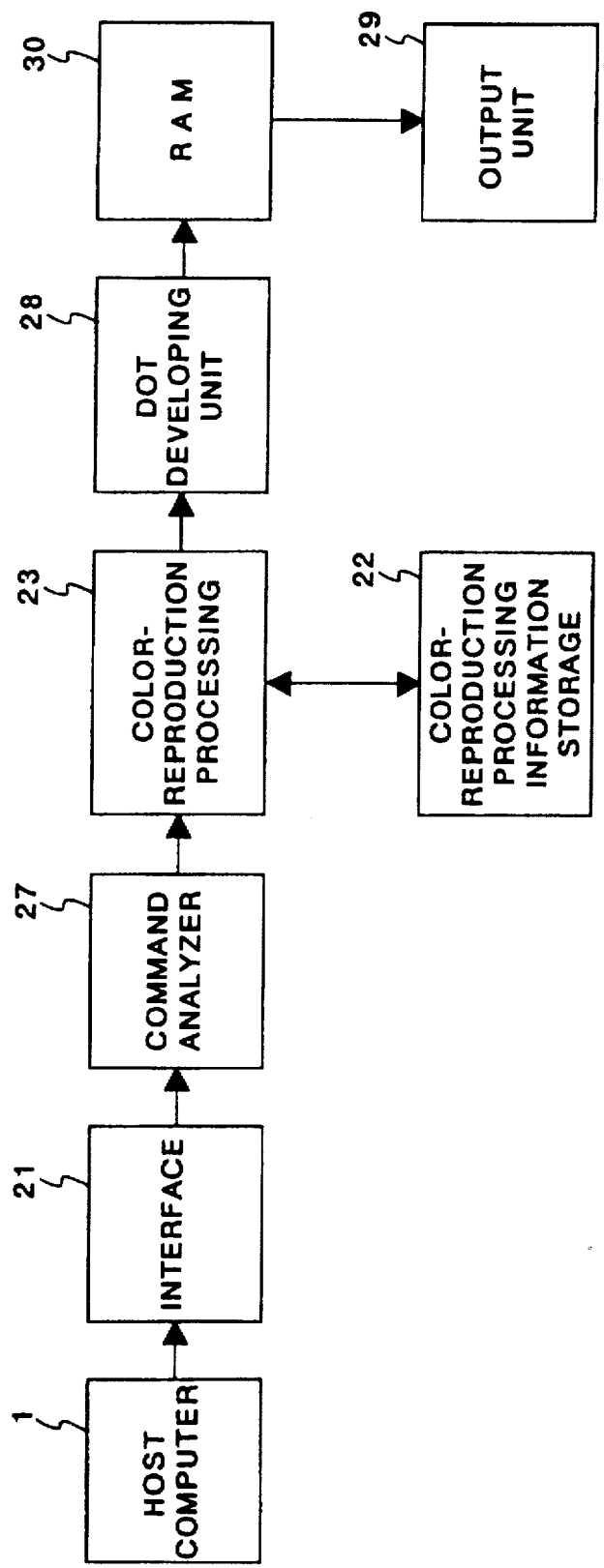
FIG. 2 is a block diagram illustrating the flow of printing data which includes color information.

FIG. 2 illustrates the flow of printing data, which includes color information, within the printing apparatus constructed as described above. In this embodiment, it is assumed that the color information possesses tone information consisting of eight bits per color component.

First, the printing data is generated by the host computer 1 and then accepted by the printing apparatus 2 through the interface 21. Next, the printing data is sent to the command analyzer 27 in order to be analyzed. The printing data is then sent to the color-reproduction processing unit 23 in dependence upon the results of analysis. The color-reproduction processing unit 23 subjects the color information to color-reproduction processing while referring to the storage unit 22 storing the color-reproduction processing information. The image data formed upon conclusion of color-reproduction processing is sent to the dot developing unit 28 in order that the data may be developed into dots. On the basis of the image data input thereto, the dot developing unit 28 develops the information in the allotted frame memory within the RAM 30. When the processing of all data ends, the data that has been developed in the RAM 30 is sent to the output unit 29, which proceeds to print out the data on paper and feed out the paper. It should be noted that the dot developing unit 28 has an internal font ROM for generating character patterns corresponding to character codes.

The printing apparatus of this embodiment is so adapted that the amount of memory necessary for the control unit 26 to execute color-reproduction processing is compared with the amount of memory usable for color-reproduction processing, and color printing is performed upon deciding whether to select an ordinary processing mode or an abbreviated processing mode for the color-reproduction processing.

The reason why the amount of memory needed for performing color-reproduction processing varies is as follows: When a command for registering a character pattern or the like is issued, as by a host computer, there are cases where the registered pattern is stored in the RAM 30. In order to manage the registered character pattern, the table for the pattern also is created in the RAM 30 as a matter of course, and therefore the area of the RAM 30 usable as the frame memory diminishes in size. In a case where a page description language (PDL) is employed as the format of the printing data, the quantity of printing data for printing one page differs depending upon what is to be printed. Accordingly, if the paint commands per page are very numerous, the capacity of the reception buffer must be correspondingly large. The needed working area of the RAM 30 varies for this reason also.

Furthermore, in a case where the received printing data in the PDL contains image data in which eight-bit tone values have been allotted to each of the color components Y, M, C and BK, the overall information quantity of the received data exceeds the printing data of a simple paint command. Accordingly, the capacity of the RAM 30 occupied by the reception buffer becomes especially large in this case. As a result, a restriction is imposed upon the area which develops the bit-map data for recording the output image.

In the present embodiment, the locations of the RAM 30 starting from its lower addresses are utilized in ascending order as the working area of the controller 26, and locations from addresses not utilized up to the final address (already known) are allotted to color-reproduction processing. Accordingly, the memory capacity usable for color reproduction can be calculated by subtracting the last address used as the working area from the last address of the ROM 30. Further, the memory capacity needed for color reproduction is obtained by multiplying the total number of pixels, which is based upon the size of the printing paper and the resolution reproduced by the output unit, by 32 bits [eight bits (256 tones) are allotted to each of the color components yellow (Y), magenta (M), cyan (C) and black (BK)]. More specifically, the memory capacity needed for color reproduction is obtained by multiplying the total number of recorded pixels (which depends upon the size of the recording medium) for one page of the recording medium (the recording paper) by 32 bits (four bytes).

In a case where the amount of memory usable for color reproduction is greater than the amount of memory needed for color reproduction, the image is recorded by performing ordinary color-reproduction processing. If it is determined that the amount of memory usable for color reproduction is less than the amount of memory needed for color reproduction, abbreviated color-reproduction processing is carried out, as mentioned earlier. In abbreviated color-reproduction processing, four bits (16 tones for each color component) are allotted to each color component so that color-reproduction processing may be realized using an amount of memory half of that used in ordinary color-reproduction processing.

The output unit 29 of this embodiment is assumed to use a laser-beam printer for the purpose of tone reproduction, and therefore tones are reproduced based upon well-known pulse-width modulation (PWM). In a case where eight bits are assigned to one color component and the pixel data of each color component is read in from the frame memory in RAM 30, the data is read in eight-bit units and converted into an analog signal via a D/A converter (not shown). Thereafter, pulse-width modulation is performed by comparing the analog signal with a triangular wave or the like, and a visible image is recorded based upon well-known electrophotography.

In case of the abbreviated mode, namely when only four bits are allotted to one color component, processing is formed by reading in the data in four-bit units and converting this data into an analog signal by the D/A converter. The difference for each tone value can be considered to be enlarged when the abbreviated mode is in effect.

Figure 3:
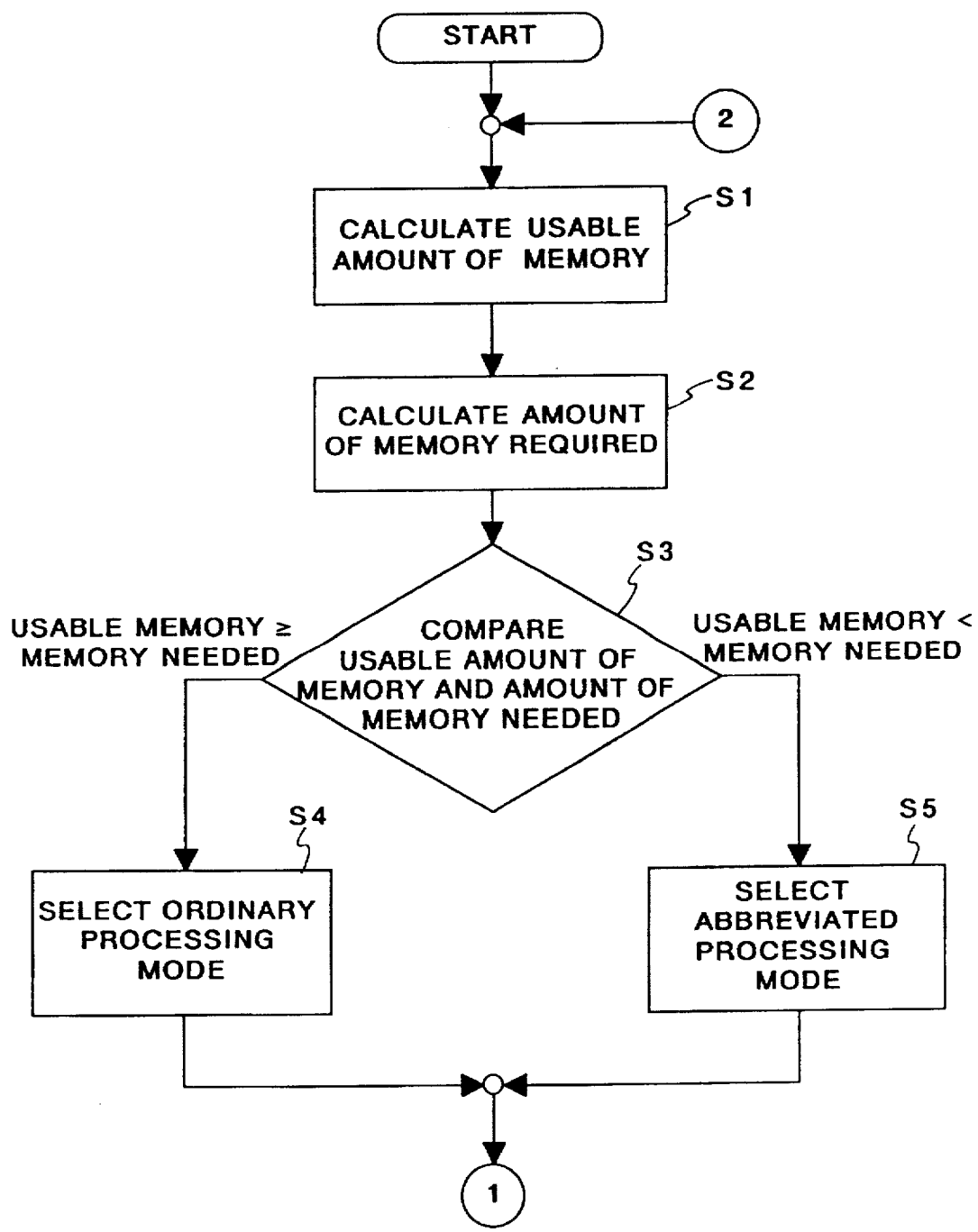

The operation performed by the printing apparatus in this embodiment will be described in accordance with the flowcharts shown in FIGS. 3 and 4. It will be assumed that the aforementioned patterns regarding printing commands from a host computer or the like have already been stored in the RAM 30, although this is not illustrated.

First, at step S1, the controller 26 calculates the amount of memory usable for color reproduction and then, at step S2, calculates the size of the frame memory necessary for ordinary color reproduction based upon the received printing data. Thereafter, the program proceeds to step S3, at which the usable amount of memory that has been calculated is compared with the amount of memory needed for color reproduction. If it is found at step S3 that a usable memory amount greater than the amount of memory needed for color reproduction can be obtained, the program proceeds to step S4, at which printing processing is set to the ordinary mode. Conversely, if it is found at step S3 that a usable memory amount is less than the memory amount needed for color reproduction, the abbreviated processing mode is set as the printing processing mode at step S5. In either case, the contents set are stored beforehand at a prescribed address in the working area of RAM 30 so that subsequent reference will be possible.

When the processing mode has thus been set, the program proceeds to step S12 (see FIG. 4), at which one unit of color information is read in. If it is determined at step S13 that there is no data to be read in, the image data that has been developed in the frame memory of RAM 30 is output to the output unit 29 in accordance with the processing mode that has been set, and the output unit 29 prints the image on the recording paper in the set mode.

In a case where color information has been read in, the program proceeds to step S14, at which it is determined what the prevailing processing mode is. If the mode is the ordinary processing mode, the program proceeds to step S15, at which the number of effective bits of one color component of the color information is made eight bits. This is followed by step S16, at which reference is made to the storage unit 22 storing the color-reproduction processing information and color-reproduction processing is executed by the color-reproduction processor 23 using eight bits of color information per color component. The program then proceeds to step S19.

In case of the abbreviated processing mode, the program proceeds to step S17, at which the read color information of eight bits per color component is converted into information composed of four bits per color component, reference is made to the information storage unit 22, and the program proceeds to step S18. Here color-reproduction processing is executed by the color-reproduction processor 23 using four bits of color information per color component. The program then proceeds to step S19. If an image possessing an eight-bit tone value for each of the color components Y, M, C, BK has been sent from a host computer, for example, the arrangement is such that only the four higher order bits of this eight-bit data are regarded as the effective tone value.

At step S19, a command is issued in such a manner that the image data formed by color-reproduction processing will be developed in the dot developing unit 28 by the effective bits decided, this data is developed in the frame memory acquired in the RAM 30, and the program returns to step S12. The above-described processing is executed until it is determined at step S13 that there is no longer any color information to be read in.

Thus, if the amount of memory is not sufficient for performing color-reproduction processing, then the color-reproduction processing is executed in the abbreviated processing mode. Consequently, though eight bits of memory per color component ordinarily are required, processing is made possible using four bits of memory per color component, and therefore color-reproduction processing can be applied to the entire image even if the memory is small. This means that the output result will not be lacking any part of the image.

In the embodiment described above, the operating status of the apparatus may be displayed on the control panel. In such case, the operator can determine the mode in which printing is taking place.

A second embodiment of the present invention will now be described.

In the processing of the first embodiment described above, the controller 26 automatically issues a command to select the abbreviated processing mode if the memory is inadequate for executing color-reproduction processing. However, an arrangement may be adopted in which this command is entered by the operator.

Figure 5:
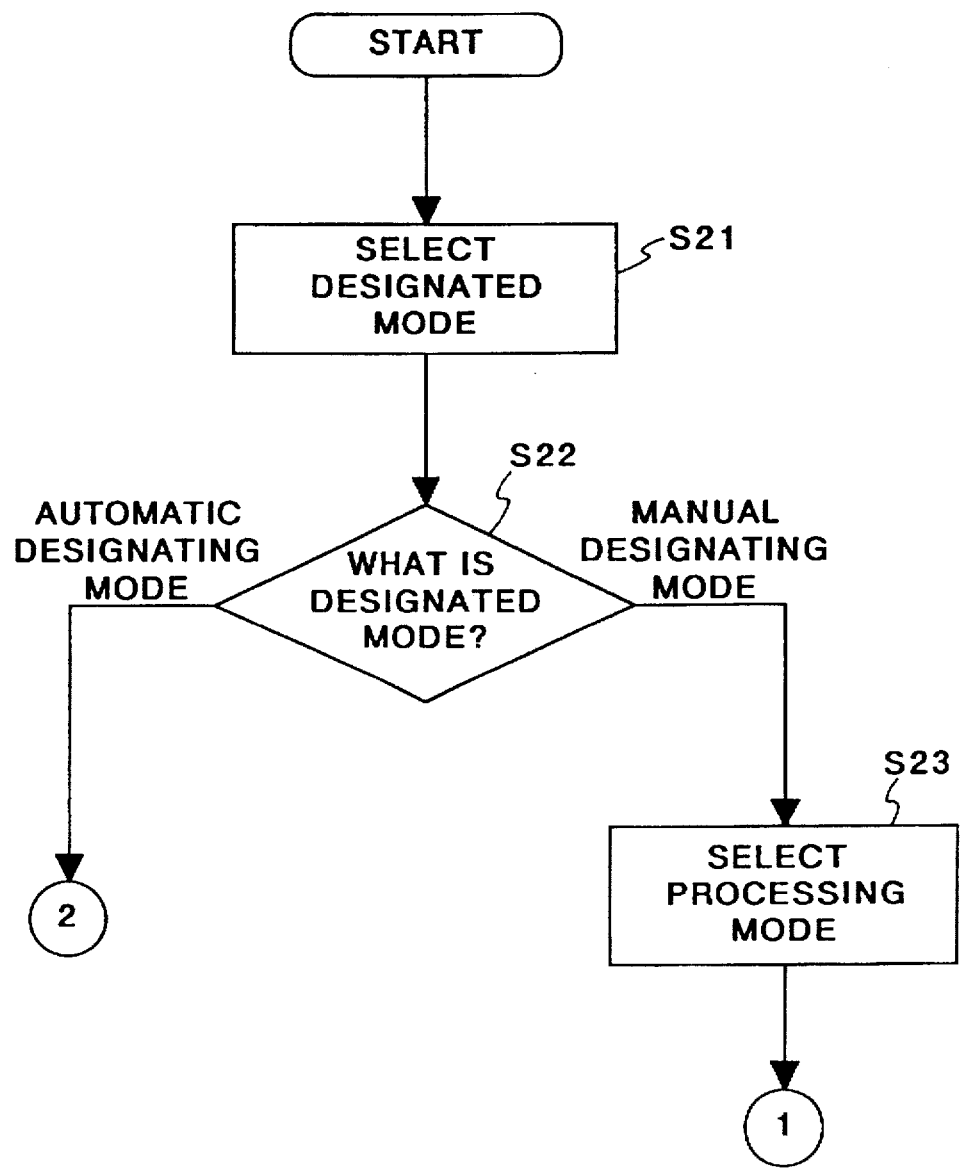
FIG. 5 is a flowchart showing processing added in a second embodiment of the invention.

In order to realize such an arrangement, the processing steps shown in FIG. 5 are added in the second embodiment. Since the construction of the apparatus is the same as that of the first embodiment, this need not be described again. In addition, the program for FIG. 5 described below also is stored in the program ROM within the controller 26.

First, at step S21 in FIG. 5, the operator enters, from the control panel 24, information which indicates whether the designated mode is to be made the above-described automatic mode or a manual mode. If it is determined at step S22 that the designation made by the operator is indicative of the automatic mode, then processing is executed from step S1 of FIG. 3. On the other hand, if the manual mode is found to have been designated, the program proceeds from step S22 to step S23, at which the operator enters the ordinary mode or the abbreviated mode from the control panel 24. The entered mode is stored at a prescribed address of the RAM 30, just as at steps S4, S5 of FIG. 3. Thereafter, the program proceeds to step S12 (see FIG. 4). This processing has already been described and need not be discussed again. It should be noted that the selection of either the automatic mode or manual mode may be judged by a control command output by the host computer or the like.

Thus, as set forth above, it is possible to select either of two designating modes, namely an automatic designating mode in which the controller 26 automatically selects either the ordinary processing mode or abbreviated processing mode for use in color-reproduction processing, or a manual designating mode in which the operator selects either the ordinary processing mode or abbreviated processing mode from the host computer 1 or the control panel 24. As a result, color-reproduction processing is applied to the entire image at all times and the output results do not lack any part of the image. Moreover, if it is desired to obtained output results in the ordinary processing mode, even if part of the image is missing, this can be accomplished according to the second embodiment described above.

In accordance with the first and second embodiments, as set forth above, image recording is performed upon reducing the number of tones when the amount of memory usable for recording of the image is less than the amount of memory needed for such recording. As a result, a situation can be avoided in which a reproduced image is missing part of what it should contain.

A third embodiment of the invention will now be described.

Briefly, according to the third embodiment, the controller 26 compares the amount of memory capacity required for performing color-reproduction processing with the amount of memory usable for performing color-reproduction processing. When it is judged that the amount of memory required for performing color-reproduction processing is greater that the usable amount of memory, the operator is so informed and then selects either the ordinary processing mode or the abbreviated processing mode as the mode for color-reproduction processing. Color printing is carried out in the mode selected.

Figure 6:
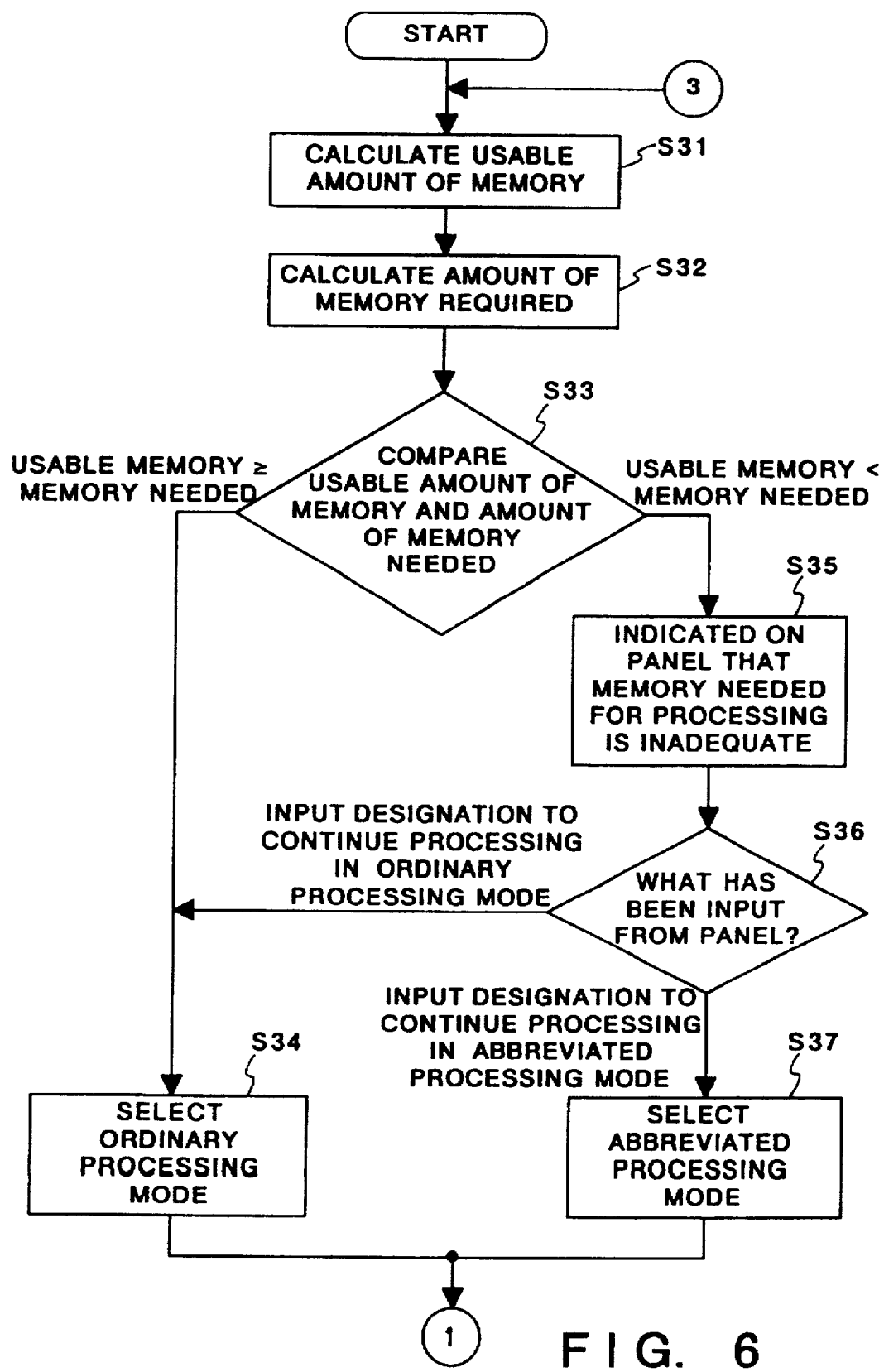
FIG. 6 is a flowchart illustrating the contents of processing in a third embodiment of the invention.

The operation of the third embodiment will now be described in accordance with the flowchart of FIG. 6. It will be assumed that image pattern data relating to printing designation from the host computer or the like has already been stored in the ROM 30. Since the construction of the apparatus is the same as that of the first embodiment, this need not be described again. In addition, the program for FIG. 5 described below also is stored in the program ROM within the controller 26.

First, at step S31, the controller 26 calculates the amount of memory usable for color reproduction and then, at step S32, calculates the size of the frame memory necessary for ordinary color reproduction based upon the received printing data. Thereafter, the program proceeds to step S33, at which the usable memory amount that has been calculated is compared with the amount of memory needed for color reproduction. If it is found at step S33 that are usable amount of memory greater than the amount of memory needed for color reproduction can be obtained, the program proceeds to step S34, at which printing processing is set to the ordinary mode. Conversely, if it is found at step S33 that the usable memory amount is less than the amount of memory needed for color reproduction, then the program proceeds to step S35. Here, in order to inform the operator of the fact that the amount of memory is inadequate for processing, an indication to this effect is displayed (or otherwise provided via) the control panel. The means for presenting this indication may be an alarm tone or a specific LED display or a combination of both of these means. The program then proceeds to step S36, at which the apparatus waits for an input instruction from the operator. In a case where the input is a designation to continue processing in the ordinary mode, the program proceeds to step S34. On the other hand, if the input is a designation to continue processing in the abbreviated processing mode, then the program proceeds to step S37, at which printing processing is executed in accordance with the abbreviated processing mode. Since the processing in the ordinary mode and abbreviated mode is the same as in the first embodiment, description thereof is omitted.

Thus, in accordance with the third embodiment, if the memory capacity is inadequate for color-reproduction processing, the operator is so informed and color-reproduction processing is executed in the abbreviated mode if the operator so wishes. Consequently, though eight bits of memory per color component ordinarily are required, processing is made possible using four bits of memory per color, and therefore color-reproduction processing can be applied to the entire image even if the memory capacity is small. This means that the output result will not be lacking any part of the image.

Further, when color-reproduction processing is performed in the ordinary mode, the operator is informed appropriately if it is determined that an image portion is lacking. Then, if the operator desires to output the entire image, albeit with some reduction in the number of image tones, the entire image can be output in the abbreviated mode.

In the first through third embodiments described above, an example is illustrated in which the ordinary processing mode for color-reproduction processing possesses eight bits (256 tones) of information per color component as the color information, while the abbreviated processing mode possesses four bits of tone information per color component. However, it goes without saying that the present invention is applicable regardless of the combination of the numbers of bits of tone information per color component.

Though the method through which the number of bits of tone information in the color information is converted from the number of bits in the ordinary processing mode for color reproduction to the number of bits in the abbreviated processing mode for color reproduction is not specifically illustrated, it will suffice to adopt an arrangement in which the four higher order bits of eight bits are used if, say, eight bits of a color component are converted to four bits. However, the invention is applicable regardless of the method of conversion adopted.

Though the example described in the embodiments is one in which character-pattern registration and page-describing language data are the causes of the reduction in the capacity of the frame memory in RAM 30, it goes without saying that the present invention is applicable regardless of the cause of the reduction in memory capacity available.

For example, an arrangement may be adopted in which the ordinary processing mode and abbreviated processing mode are made selectable with regard to recording paper of a prescribed size under standard conditions, with operation being performed in the abbreviated mode when an image is recorded on recording paper whose size exceeds the prescribed size. The RAM 30 is arranged so as to be capable of being enlarged, and operation in the ordinary processing mode is made possible even with regard to recording paper of a size in excess of the prescribed size by virtue of this increase in memory capacity. In such case, the processing mode may be changed over automatically or manually, in conformity with the memory capacity of the RAM 30, with regard to recording paper whose size is greater than the prescribed size.

Furthermore, in a case where the usable amount of memory is less than the amount of memory needed for processing in the foregoing embodiments, an indication to this effect is presented on the control panel and either the ordinary mode or abbreviated mode is selected. However, an arrangement can be adopted in which, when the abbreviated mode has been selected, the degree of abbreviation can be designated. In other words, with such an arrangement, the extent of the reduction in the number of tones to be reproduced can be designated. Since the number of tones will no longer be uniform in such case, it will be possible to make effective utilization of the memory used and to minimize the decline in the number of tones.

Further, an arrangement can be adopted in which, when the controller 26 decides that processing is to be executed in the abbreviated mode, the maximum number of bits allotted to one color component is calculated based upon the usable amount of memory, and the image is recorded based upon the calculated number of bits. Such an arrangement will make it possible to minimize the deterioration in tonality. Moreover, since the decision is made by the apparatus automatically, the burden placed upon the operator can be mitigated.

As for the calculation of the maximum number of bits, let tp represent the total number of recorded pixels, q bits the usable amount of memory and nc the number of recorded color components (four in this embodiment, namely Y, M, C and BK). It will then suffice to find the largest integer m which satisfies the following inequality:

$$TP \cdot nc \cdot m \leq q$$

In an apparatus which records a monochromatic tone image, nc=1 will hold as a matter of course.

Though a laser-beam printer is taken as an example in the foregoing embodiments, the invention is not limited thereto but naturally is applicable to other types of printers as well.

Further, though the example described in the foregoing embodiments is one in which the invention is applied to a printing apparatus, it is permissible to adopt an arrangement in which an apparatus consisting solely of the components which perform the above-described processing is positioned between an external device which transmits printing data and a printer.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

means for inputting input information from an external apparatus;

memory means for storing image data including a plurality of pixel data, each representing a gradation of one pixel of an image;

selection means for selecting either a first mode or a second mode; and image data generating means for generating and storing in said memory means image data including a plurality of n-bit pixel data in the first mode, each of the pixel data corresponding to a gradation of one pixel represented by n bits, and a plurality of m-bit (m<n) pixel data in the second mode, each of the pixel data corresponding to a gradation of one pixel represented by m bits.

2. The apparatus according to claim 1, wherein said apparatus is arranged to select either the first mode or the second mode on the basis of the capacity of the memory means available for storing the generated image data.

3. An apparatus according to claim 1, wherein said image generating means includes a font memory to generate character patterns in accordance with character codes.

4. An apparatus according to claim 1, further comprising comparing means for comparing an amount of memory usable for storing the image data and an amount of memory needed for storing the image data using n bits to represent each pixel, wherein said image data generating means generates the image data in the second mode, when the amount of memory needed for storing the image data using n bits for each pixel is greater than the usable amount of memory.

5. The apparatus according to claim 4, wherein the amount of memory usable for storing the image data is decided by calculating memory capacity required as a working area in the memory means and subtracting the calculated working area memory capacity from the total capacity of the memory means.

6. An apparatus according to claim 4, wherein the amount of memory needed for storing the image data is decided on the basis of the size of a recording medium on which the image data is to be recorded.

7. The apparatus according to claim 1, wherein said image data generating means comprises means for reducing the number of bits used to represent each pixel from n bits to m bits (m<n).

8. An apparatus according to claim 4, further comprising informing means from informing a comparison result of said comparing means.

9. An apparatus according to claim 1, further comprising an operating panel for selecting either the first mode or the second mode.

10. An apparatus according to claim 1, further comprising comparing means for comparing an amount of memory usable for storing the image data and an amount of memory needed for storing the image data using n bits to represent each pixel, and informing means for informing about a comparison result of said comparing means, when the amount of memory needed for storing the image data using n bits for each pixel is greater than the usable amount of memory.

11. An apparatus according to claim 10, further comprising an operating panel, wherein the second mode can be selected using the operating panel, when said informing means informs about the comparison result.

12. An apparatus according to claim 1, further comprising recording unit for recording an image in accordance with the image data stored in said memory means.

13. An apparatus according to claim 12, wherein said recording unit is adapted to record an image using an electrophotographic method.

14. An apparatus according to claim wherein said image processing apparatus processes image data having a plurality of color components, and each of the n-bit pixel data corresponds to a gradation of one color component pixel in the first mode and each of the m-bit pixel data corresponds to a gradation of one color component pixel in the second mode.

15. An apparatus according to claim 1, wherein said image processing apparatus comprises a color printer for recording color image in accordance with the image data stored in said memory means.

16. An apparatus according to claim 4, further comprising informing means for informing about a use of a comparison result of said comparing means.

17. An apparatus according to claim 1, further comprising an operating panel for selecting either the first mode or the second mode.

18. An apparatus according to claim 1, further comprising a recording unit for recording an image in accordance with the image data stored in said memory means.

* * * * *